(12) United States Patent
McColloch

(10) Patent No.: US 7,331,720 B1
(45) Date of Patent: Feb. 19, 2008

(54) TRANSCEIVER MODULE FOR OPTICAL COMMUNICATIONS AND METHOD FOR TRANSMITTING AND RECEIVING DATA

(75) Inventor: Laurence Ray McColloch, Santa Clara, CA (US)

(73) Assignee: Avago Technologies Fiber IP Pte Ltd, Singapore (SG)

( * ) Notice: Subject to any disclaimer, the term of this patent is extended or adjusted under 35 U.S.C. 154(b) by 0 days.

(21) Appl. No.: 11/669,247

(22) Filed: Jan. 31, 2007

Related U.S. Application Data

(60) Provisional application No. 60/862,200, filed on Oct. 19, 2006.

(51) Int. Cl.
*G02B 6/42* (2006.01)
(52) U.S. Cl. ............................ 385/88; 385/14; 385/15; 359/808
(58) Field of Classification Search .................. 385/14, 385/15, 88; 359/808
See application file for complete search history.

(56) References Cited

U.S. PATENT DOCUMENTS

| | | | | |
|---|---|---|---|---|
| 6,574,107 | B2* | 6/2003 | Jeon et al. | 361/709 |
| 7,109,524 | B2* | 9/2006 | Killer | 257/82 |
| 7,228,020 | B2* | 6/2007 | Weigert | 385/14 |
| 2004/0028315 | A1* | 2/2004 | Weigel | 385/14 |
| 2004/0061956 | A1* | 4/2004 | Schunk et al. | 359/808 |

* cited by examiner

*Primary Examiner*—Frank G. Font
*Assistant Examiner*—Eric Wong

(57) ABSTRACT

A transceiver module for optical communications is provided in which the leadframe assembly includes at least first and second die attach regions to which the laser diode driver IC and the laser diode IC are secured, respectively. A slot formed in the leadframe between the first and second die attach regions provides an air gap that at least partially thermally isolates the laser diode IC from the laser diode driver IC. This air gap results prevents heat generated by the laser diode driver IC from appreciably affecting the temperature of the laser diode IC, and thus from detrimentally affecting the performance of the laser diode IC. This slot also allows contact pads of the laser diode IC to be directly connected by leads to contact pads of the laser diode driver IC, which reduces the lengths of the leads and thus their inductances, which prevents EMI problems from occurring.

20 Claims, 12 Drawing Sheets

TRANSCEIVER MODULE FOR OPTICAL COMMUNICATIONS AND METHOD FOR TRANSMITTING AND RECEIVING DATA

CROSS-REFERENCE TO RELATED APPLICATIONS

This application claims priority to U.S. Provisional Application Ser. No. 60/862,200, entitled "TRANSCEIVER AND CONNECTOR", filed on Oct. 19, 2006, which is incorporated herein by refeference in its entirety.

TECHNICAL FIELD OF THE INVENTION

The invention relates to optical communications. More particularly, the invention relates a transceiver module for use in optical communications.

BACKGROUND OF THE INVENTION

FIG. 1 illustrates a block diagram of a transceiver module 2 currently used in optical communications. The transceiver module 2 includes a transmitter portion 3 a receiver portion 4. The transmitter and receiver portions 3 and 4 are controlled by a transceiver controller 6. The transmitter portion 3 comprises components for transmitting data in the form of amplitude modulated optical signals over multiple fibers (not shown). The transmitter portion includes a laser driver 11 and a plurality of laser diodes 12. The laser driver 11 outputs electrical signals to the laser diodes 12 to modulate the laser diodes 12, thereby causing them to output optical signals that have power levels corresponding to logic 1s and logic 0s. An optics system (not shown) of the transceiver module 2 focuses the coherent light beams produced by the laser diodes 12 into the ends of respective transmit optical fibers (not shown) held within a connector (not shown) that mates with the transceiver module.

A plurality of monitor photodiodes 14 monitor the output power levels of the respective laser diodes 12 and produce respective electrical analog feedback signals that are delivered to an analog-to-digital converter (ADC) 15, which converts that electrical analog signals into digital signals. The digital signals are input to the transceiver controller 6, which processes them to obtain respective average output power levels for the respective laser diodes 12. The controller 6 outputs controls signals to the laser driver 11 to cause it to adjust the respective bias current signals output to the respective laser diodes 12 such that the average output power levels of the laser diodes are maintained at relatively constant levels.

The receiver portion 4 includes a plurality of receive photodiodes 21 that receive incoming optical signals output from the ends of respective receive optical fibers (not shown) held in the connector referred to above that mates with the transceiver module. An optics system (not shown) of the receiver portion 4 focuses the light output from the ends of the receive optical fibers onto the respective receive photodiodes 21. The connector may include an optics system that focuses light from the ends of the receive fibers onto the optics system of the receive portion of the transceiver module, which then focuses the light onto the photodiodes. The receive photodiodes 21 convert the incoming optical signals into electrical analog signals. An ADC 22 converts the electrical analog signals into electrical digital signals suitable for processing by the transceiver controller 6. The transceiver controller 6 processes the digital signals to recover the data represented by the signals.

The laser driver 11 is typically implemented as an integrated circuit (IC). Likewise, the transceiver controller 6 is typically implemented as an IC. The laser diodes 12, the monitor photodiodes 14 and the receive photodiodes 21 are typically implemented in respective separate ICs. The transceiver module 2 typically includes a printed circuit board (PCB) (not shown) or flex circuit (not shown) to which these ICs are die attached and wire bonded to allow the ICs to communicate with one another as needed. The transceiver module 2 typically also includes a heat spreader device (not shown) for dissipating heat generated by the ICs. The IC in which the laser diodes 12 are implemented has a reliability that is strongly influenced by temperature. The laser diodes may be, for example, vertical cavity surface-emitting laser diodes (VCSELs), which, like other laser diodes, have a performance level that degrades as temperature increases. The laser diode IC generates heat that can detrimentally affect its own performance. In addition, the IC in which the laser diode driver is implemented generates even more heat.

While a heat spreader device is generally effective at dissipating heat generated by the ICs by spreading it out and moving it away from the ICs, the heat spreader device is not always sufficient to prevent the temperature of the laser diode IC from increasing to the point at which laser performance degrades. For example, in one known transceiver module of the type described above with reference to FIG. 1, the VCSEL IC (contains the VCSELs) and the VCSEL driver IC (drives the VCSELs) are attached to a top surface of a flex circuit that is mounted to a top surface of a copper heat spreader device. In this case, heat generated by the VCSEL driver IC flows into the heat spreader device, generating heat in the heat spreader device that flows into the VCSEL IC. Therefore, heat generated by the VCSEL driver IC can increase the temperature of the VCSEL IC, and thus detrimentally affect its performance.

One way to prevent heat generated by the VCSEL driver IC from affecting the VCSEL IC is to position the VCSEL IC and the VCSEL driver IC a substantial distance away from each other on the PCB or flex circuit. By doing this, heat that flows into the heat spreader device from the VCSEL driver IC should not affect the temperature of the VCSEL IC. However, increasing the distance between the VCSEL driver IC and the VCSEL IC can create other problems. In particular, the increased distance results in the electrical paths between the VCSEL driver IC and the VCSEL IC having increased lengths, which can increase the inductance of the paths. This increase in inductance degrades signal integrity and can result in an increase in electromagnetic interference (EMI). In addition, in order to increase the distance between the VCSEL driver IC and the VCSEL IC, it may be necessary to increase the overall size of the transceiver module, which is generally undesirable for a variety of reasons.

The connector holds the optical fibers and mates with the transceiver module has one, but typically two or more, locking mechanisms that mate with locking mechanisms on the transceiver module to secure the connector to the transceiver module. The mating should be very precise so that the ends of the optical fibers held in the connector are aligned with the optics systems of the transceiver module when the connector is secured to the transceiver module. If the mating is not extremely precise, the optical alignment also will not be extremely precise, and performance will suffer. A variety of transceiver modules and connectors exist that are configured to mate very precisely and provide very precise optical alignment between the laser diodes, the optics system and the transmit fiber ends on the transmit side and between the receive fiber ends, the optics system and the receive photodiodes on the receive side. One problem associated with many existing designs is that heat generated by the ICs of the transceiver module causes the components of the optics systems and other components of the transceiver module and/or of the connector to expand. This expansion can result in problems with the optical alignment, which can degrade performance.

It would be desirable to provide a transceiver module having a design that thermally isolates the laser diode driver IC from the laser diode IC without increasing the lengths of the electrical paths between the ICs. It would also be desirable to provide a transceiver module having a design in which the lengths of the electrical paths between the laser diode driver IC and the laser diode IC are reduced in order to improve signal integrity and reduce EMI. It would also be desirable to provide a transceiver module having a design that ensures that precise optical alignment on the transmit side and receive side of the transceiver module is maintained despite any heat generated by one or more of the ICs of the transceiver module.

SUMMARY OF THE INVENTION

In accordance with the invention, a transceiver module and method for optical communications are provided in which the leadframe assembly includes at least first and second die attach regions to which the laser diode driver IC and the laser diode IC are secured, respectively. A slot formed in the leadframe between the first and second die attach regions provides an air gap that at least partially thermally isolates the laser diode IC from the laser diode driver IC. This leadframe air gap results prevents heat generated by the laser diode driver IC from appreciably affecting the temperature of the laser diode IC, and thus from detrimentally affecting the performance of the laser diode IC. This slot also allows contact pads of the laser diode IC to be directly connected by short leads to contact pads of the laser diode driver IC. The leadframe air gap allows the lengths of the leads to be reduced, which reduces their inductances. The reduction in the inductances of the leads improves signal integrity and reduces EMI.

These and other features and advantages of the invention will become apparent from the following description, drawings and claims.

DETAILED DESCRIPTION OF AN ILLUSTRATIVE EMBODIMENT

In accordance with the invention, a transceiver module for optical communications is provided in which the leadframe assembly includes at least first and second die attach regions to which the laser diode driver IC and the laser diode IC are secured, respectively. A slot formed in the leadframe between the first and second die attach regions provides an air gap that at least partially thermally isolates the laser diode IC from the laser diode driver IC. This air gap results prevents heat generated by the laser diode driver IC from appreciably affecting the temperature of the laser diode IC, and thus from detrimentally affecting the performance of the laser diode IC. This slot also allows contact pads of the laser diode IC to be directly connected by leads to contact pads of the laser diode driver IC, which reduces the lengths of the leads and thus their inductances. This reduction in inductance improves signal integrity and reduces EMI.

Figure 1:
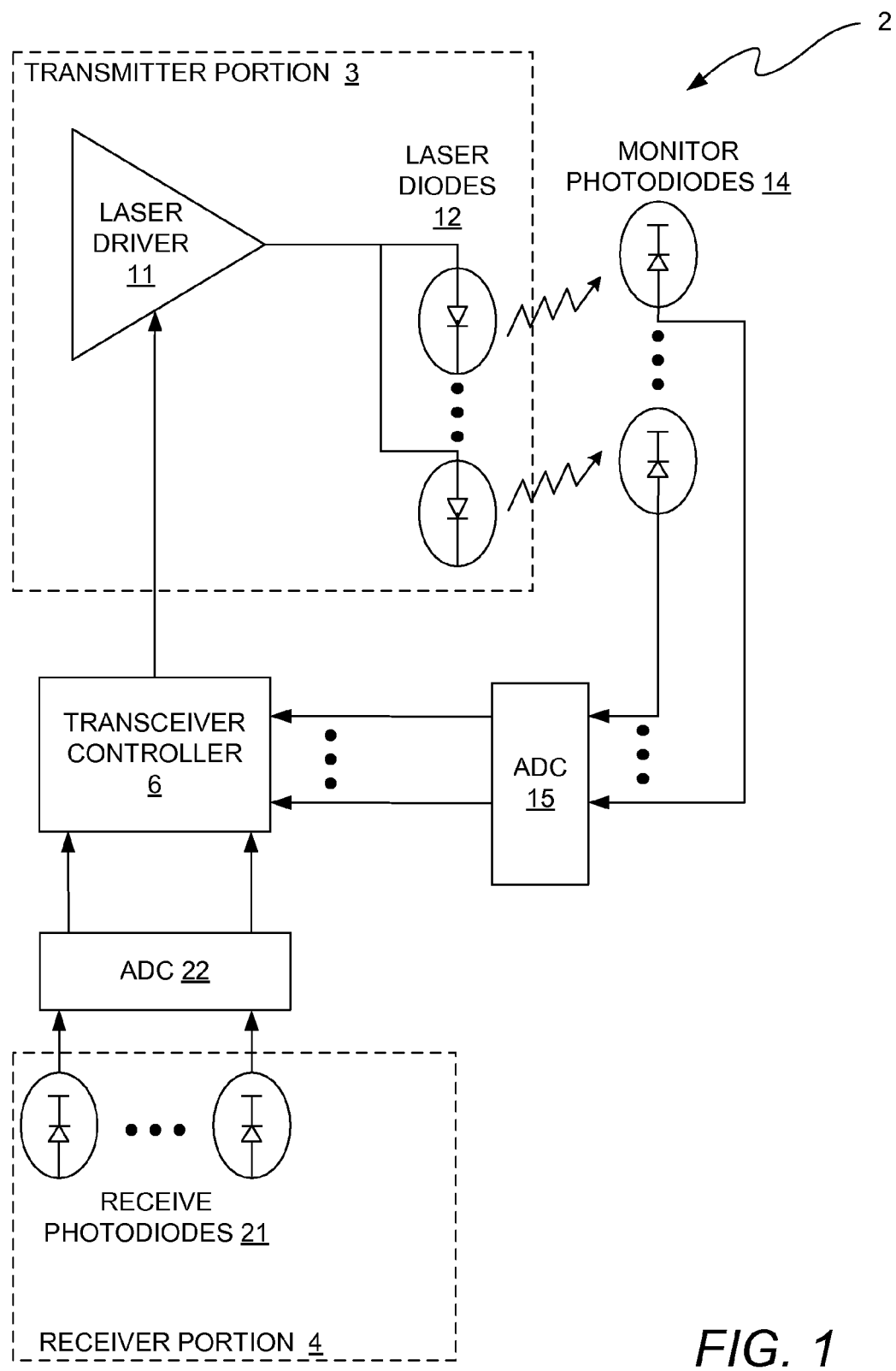
FIG. 1 illustrates a block diagram of a transceiver module currently used in optical communications.
Figure 2:
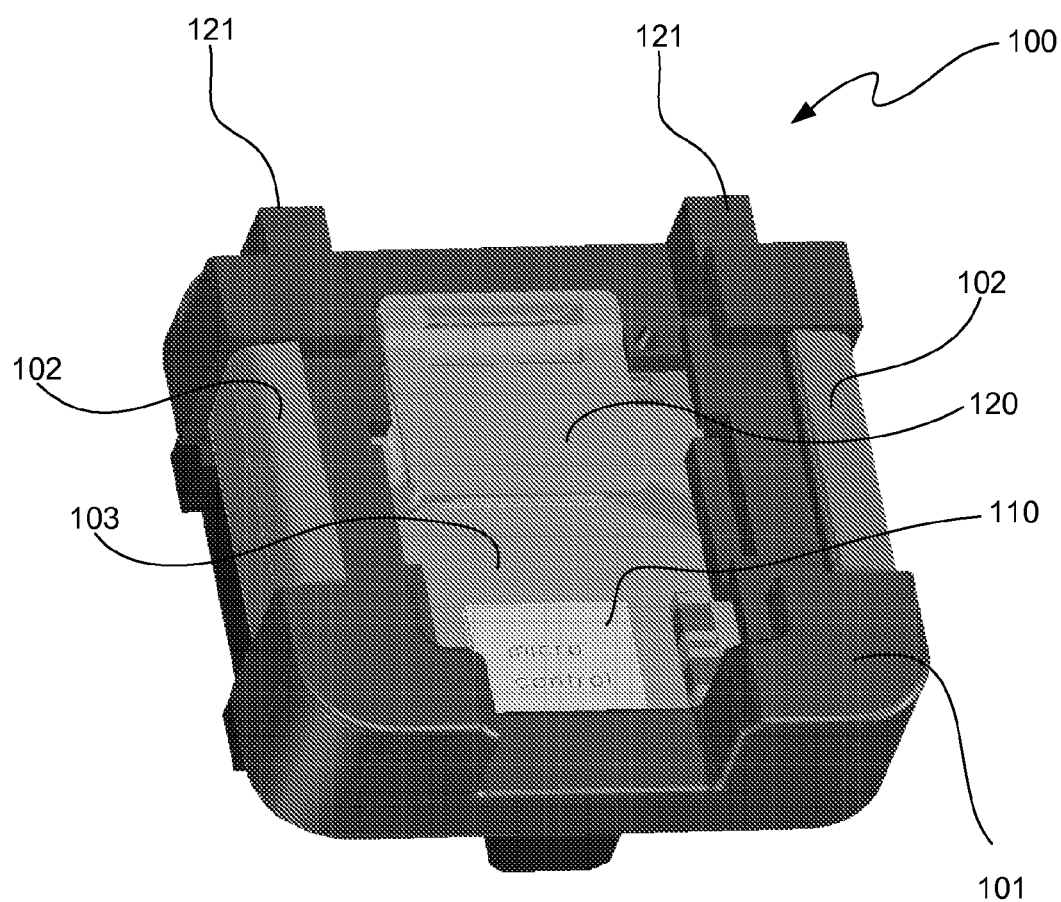
FIG. 2 illustrates a perspective top view of the transceiver module of the invention in accordance with an illustrative embodiment.

FIG. 2 illustrates a perspective top view of the transceiver module 100 of the invention in accordance with an illustrative embodiment. The transceiver module 100 includes a molded housing 101, a leadframe 102, a PCB 103, a controller 110, an optics system 120, and a sliding-lock mechanism 121. The transceiver module 100 also includes components that cannot be seen in the view illustrated in FIG. 2 due to the fact that they are located below the optics system 120, such as a VCSEL driver IC (not shown), a VCSEL IC (not shown), a monitor photodiode IC (not shown) and a receive photodiode IC (not shown). The PCB 103 is mounted to the bottom side of the leadframe 102 and the ICs are mounted to the top side of the leadframe 102 and wire bonded to the PCB 103, as described in more detail below with reference to FIG. 3.

Figure 3:
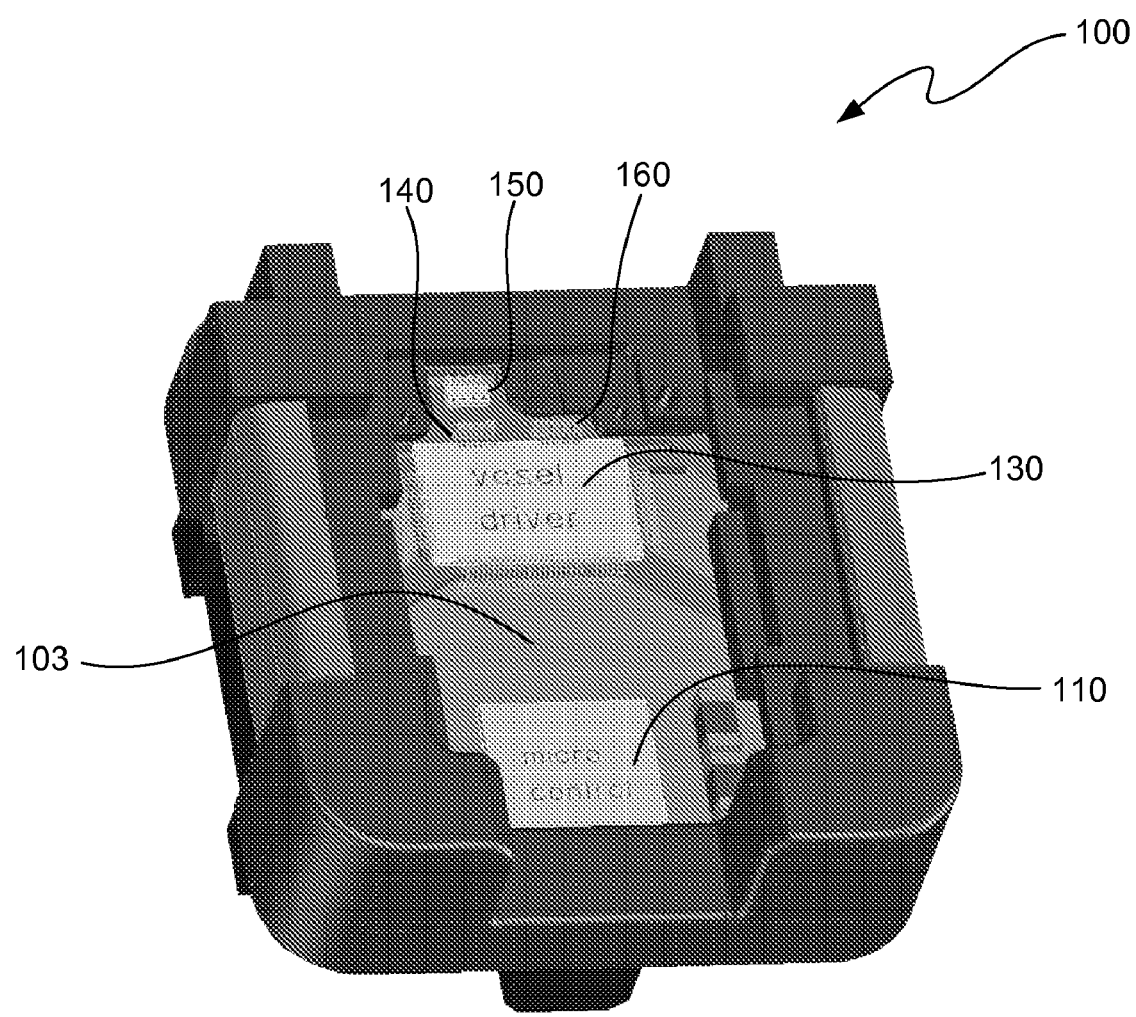
FIG. 3 illustrates a perspective top view of the transceiver module shown in FIG. 2 with the optics system removed to show the VCSEL driver IC, the VCSEL IC, the monitor photodiode IC, and the receive photodiode IC.

FIG. 3 illustrates a perspective top view of the transceiver module 100 shown in FIG. 2 with the optics system 120 removed to show the VCSEL driver IC 130, the VCSEL IC 140, the monitor photodiode IC 150, and the receive photodiode IC 160. Some of the contact pads (not shown) of the ICs 130, 140, 150 and 160 are wire bonded to conductors of the PCB 103. Particular contact pads of the VCSEL driver IC 130 are directly wire bonded to particular contact pads of VCSEL IC 140. Likewise, particular contact pads of the VCSEL driver IC 130 are directly wire bonded to particular contact pads of the receive photodiode IC 160. The transceiver controller 110 is an IC that is also die attached to the PCB 103. The contact pads of the controller IC 110 are wire bonded to conductors of the PCB 103 to provide the electrical interconnections between the controller 110 and the ICs 130-160.

The direct wire bonds between pads of the VCSEL driver IC 130 and pads of the VCSEL IC 140 and receive photodiode IC 160 result in reduced lead lengths for these ICs. One of the important features of the invention is that the VCSEL driver IC 130 and the VCSEL IC 140 are in very close proximity to one another so that the wire bonds that form the leads that electrically interconnect pads of these two ICs are very short in length. Because the leads are very short in length, i.e., typically on the order of about 0.3 to 0.4 millimeters (mm) in length, they have very low inductances and thus do not degrade signal integrity or contribute appreciably to EMI. The same is true for the leads that interconnect the receive photodiode IC 160 and the VCSEL driver IC 130.

In order to allow these ICs to be placed in very close proximity to one another, it was necessary, or at least highly desirable, to thermally isolate the VCSEL IC 140 and the receive photodiode IC 160 from the VCSEL driver IC 130. As described above, the VCSEL driver IC generates a relatively large amount of heat, which can detrimentally affect the performance of the VCSEL IC. Likewise, the heat generated by the VCSEL driver IC 130 can detrimentally affect the performance of the receive photodiode IC 160. The manner in which the ICs 140 and 160 are thermally isolated from the VCSEL driver IC 130 will now be described with reference to FIG. 4.

Figure 4:
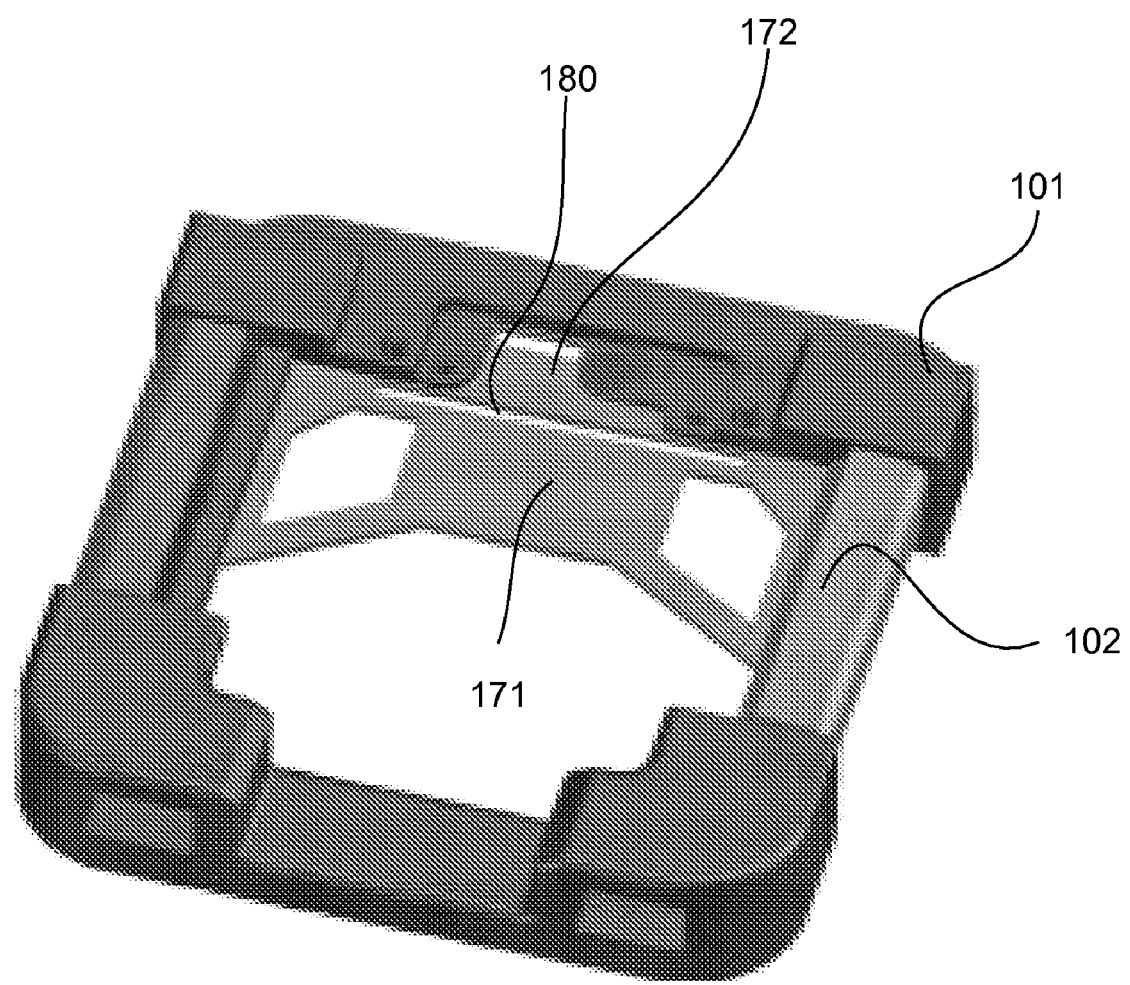
FIG. 4 illustrates a perspective top view of the molded housing with the leadframe attached to it prior to the PCB and the ICs being mounted on the leadframe 102.

FIG. 4 illustrates a perspective top view of the molded housing 101 with the leadframe 102 attached to it prior to the PCB 103 and ICs 130, 140, 150 and 160 being mounted on the leadframe 102. The portions 171 and 172 of the leadframe 102 are the die attach regions comprising the heat spreader device of the transceiver module 100. The VCSEL driver IC 130 is die attached to the upper surface of the portion 171 of the leadframe 102. The VCSEL IC 140, the photodiode monitor IC 150 and the receive photodiode IC 160 are die attached to respective locations on the upper surface of portion 172 of the leadframe 102. Heat generated by all of these ICs 130-160 is spread out over the leadframe 102 and dissipated.

Because the VCSEL driver IC 130 and the VCSEL IC 140 and receive photodiode IC 160 are mounted in such close proximity to one another, a slot 180 is formed in the leadframe 102 to create an air gap that thermally isolates the VCSEL driver IC 130 from the VCSEL IC 140 and the receive photodiode IC 160. The width of the slot is typically about 0.3 to 0.4 mm. However, the VCSEL driver IC 130 overhangs the slot 180 such that the air gap has a width that is typically about 0.1 to 0.2 mm. The slot 180 effectively prevents heat that flows from the VCSEL driver IC 130 into the portion 171 of the leadframe 102 from spreading to the portion 172 of the leadframe 102, and therefore thermally isolates the VCSEL IC 140 and the receive photodiode IC 160 from the VCSEL driver IC 130.

Figure 5:
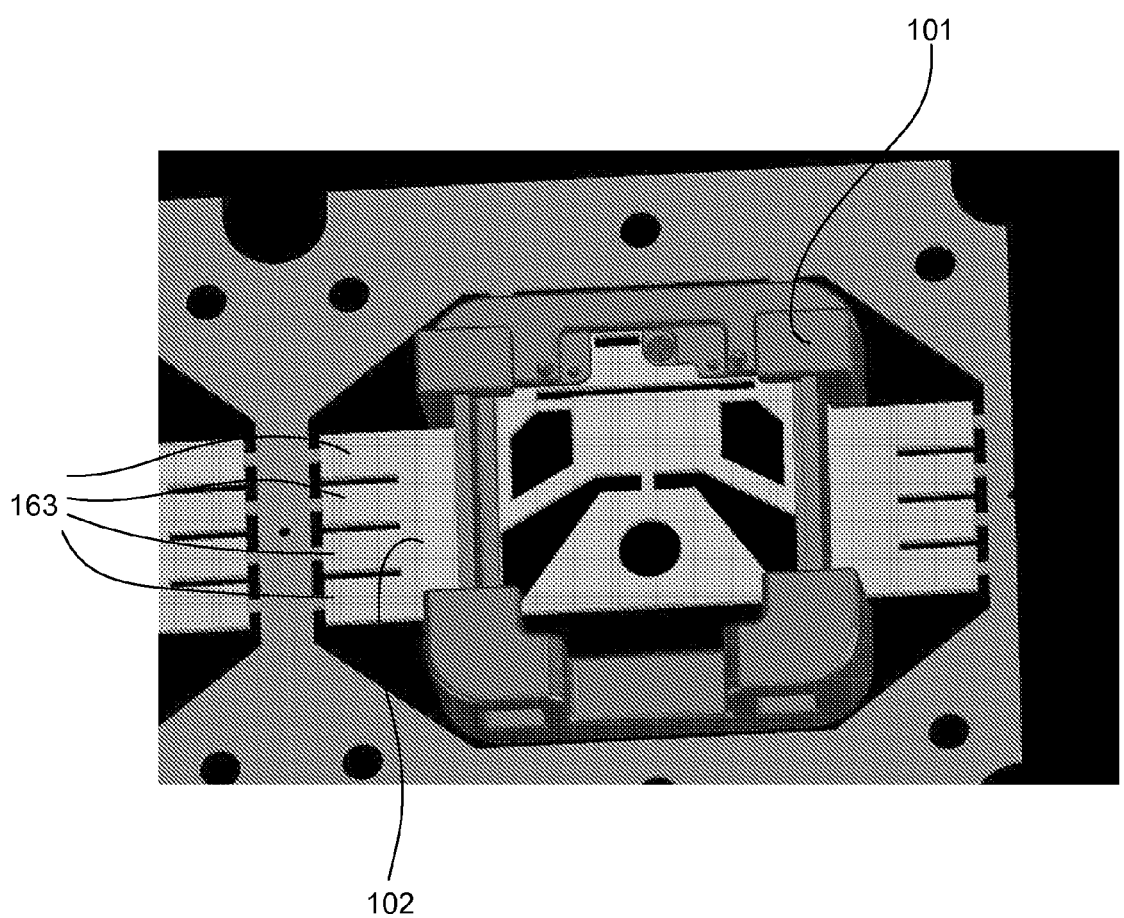
FIG. 5 illustrates a front view of multiple molded leadframe assemblies of the invention before the molded leadframe assemblies have been separated via a singulation process.

FIG. 5 illustrates a front view of multiple molded leadframe assemblies before the molded leadframe assemblies have been separated via a singulation process. The molded portion 101 of the transceiver module is typically made of a plastic material and is typically either glued or molded onto the metal leadframe 102. The side portions of the metal leadframe 102 are then folded about the molded portion 101. The fingers 163 that make up the sides of the leadframe 102 are separated by air gaps that further facilitate the spreading and dissipation of heat. The ICs 130-160 are then die attached to the molded leadframe 102 and wire bonded to the conductors of the PCB 103. The manner in which the ICs are secured to the leadframe 102 will now be described with reference to FIG. 6.

Figure 6:
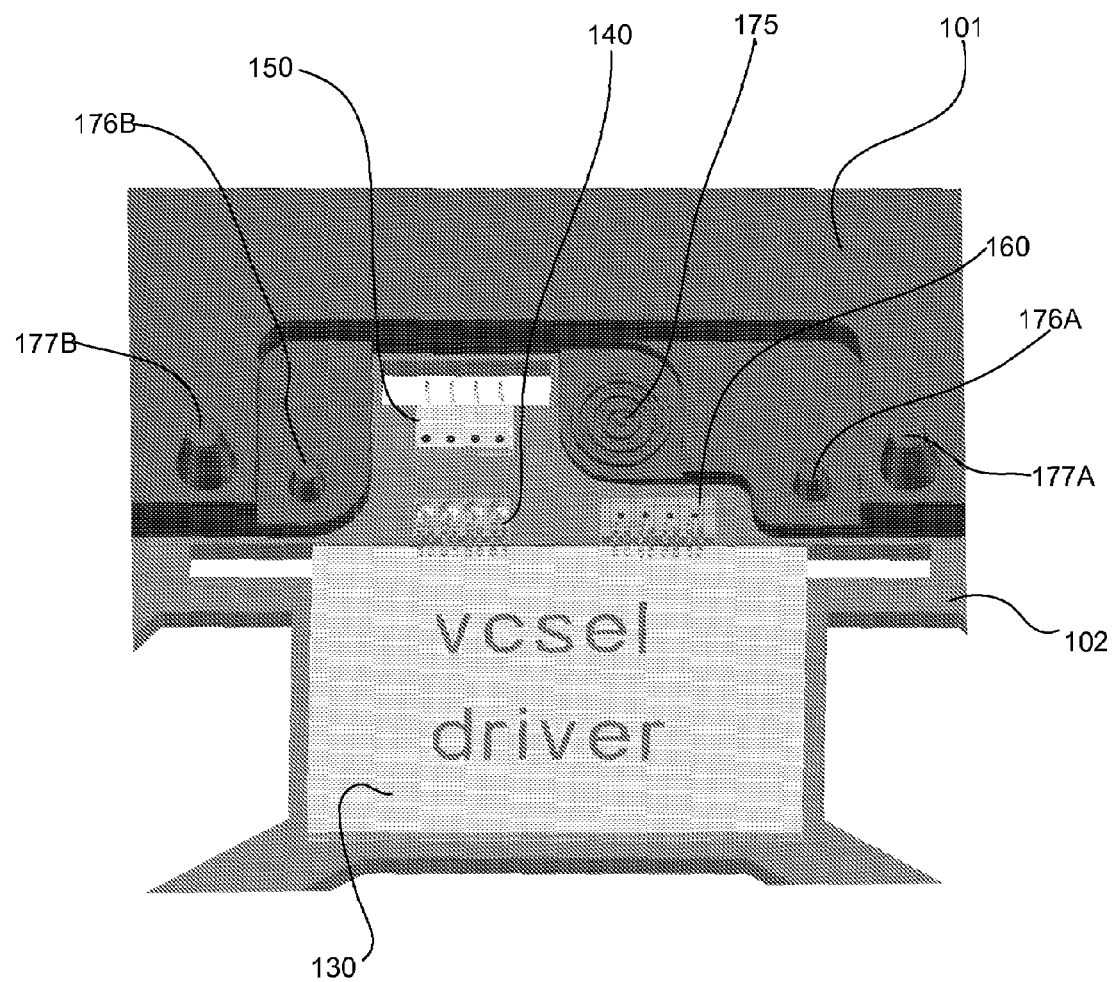
FIG. 6 illustrates a close-up front view of a portion of the molded leadframe assembly shown in FIG. 4, which shows the ICs attached to the leadframe 102 of the molded leadframe assembly.

FIG. 6 illustrates a close-up front view of a portion of the molded leadframe assembly 190, which shows the ICs 130-160 attached to the leadframe 102 of the molded leadframe assembly. A reference device 175 made up of concentric rings is formed in the molded portion 101 of the molded leadframe assembly 190. The reference device 175 is used in active alignment process by a vision system (not shown) that optically aligns itself with the center of the reference device 175 and then uses that alignment to allow the assembly process to die attach the ICs 130-160 to the leadframe 102 at the proper locations and to perform the wire bonding process. Once the die attach and wire bonding processes have been performed, a passive alignment process is performed as part of the assembly process to attach the optics system 120 (FIG. 2) to the molded leadframe assembly 190. The molded leadframe assembly 190 has a pair of cone-shaped protrusions 176A and 176B that are shaped to engage cone-shaped openings formed in the housing (not shown) of the optics system 120 when protrusions 176A and 176B are in alignment with the openings. The assembly 190 has a pair of cone-shaped protrusions 177A and 177B that are shaped to engage cone-shaped openings formed in the connector housing (not shown) when the protrusions 177A and 177B are in alignment with the openings formed in the connector housing, as described below in detail with reference to FIG. 8.

Figure 7:
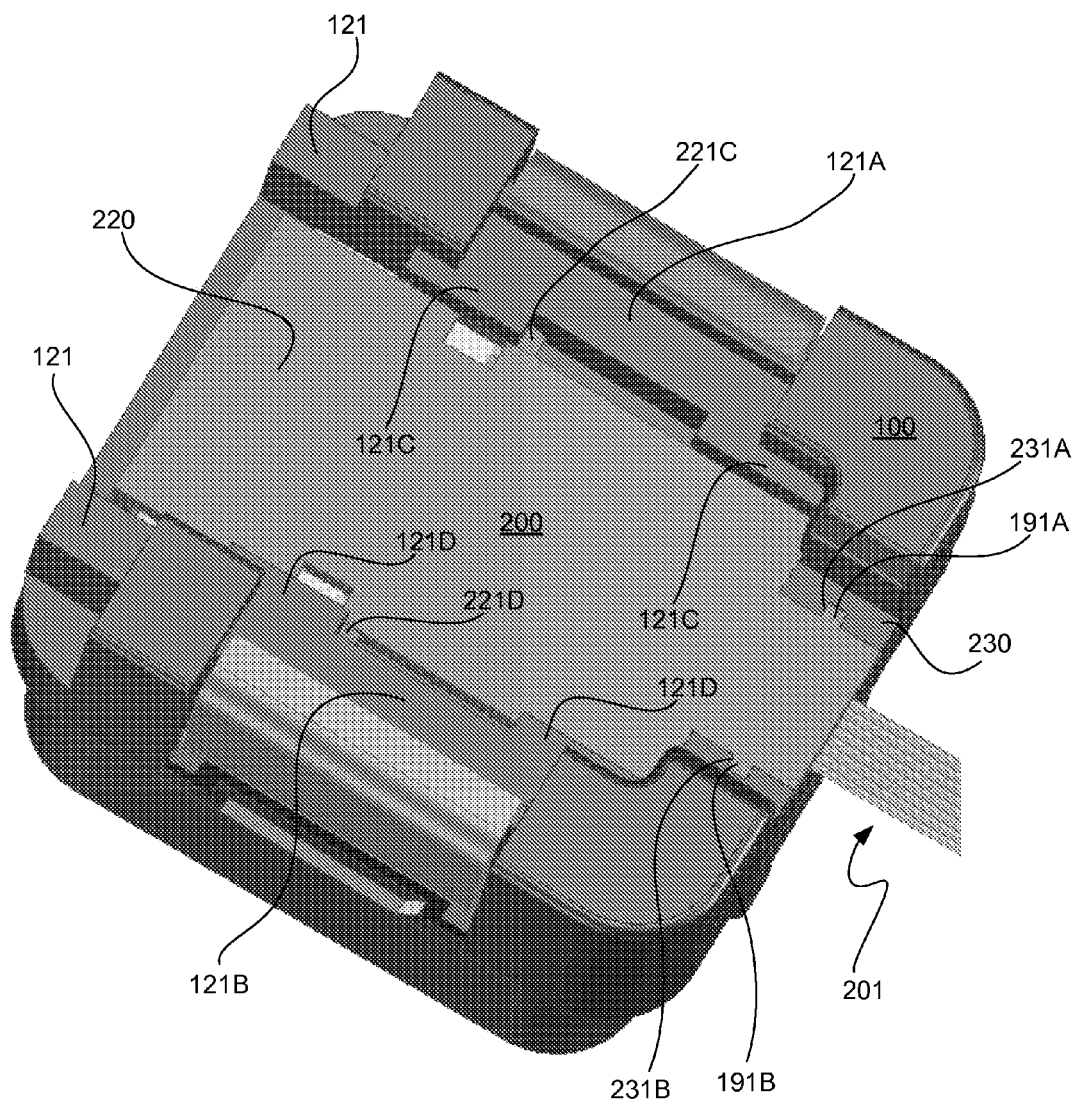
FIG. 7 illustrates a top perspective view of the transceiver module shown in FIG. 2 coupled in locking engagement with a connector module.

FIG. 7 illustrates a top perspective view of the transceiver module 100 coupled in locking engagement with a connector module 200. The connector module 200 holds the ends of a plurality of optical fibers of an optical fiber ribbon cable 201 and secures them in a way that provides strain relief from forces exerted on the fibers and optically aligns the ends of the fibers with an optics system (not shown) within the connector module 200, as will be described below with reference to FIGS. 8 and 9A-9D. The sliding-lock mechanism 121 includes a pair of side sliding members 121A and 121B that place a downward force on the connector module 200 that presses down on the connector module 200 and holds it in place in locking engagement with the transceiver module 100. Each of the side sliding members 121A and 121B has a pair of outwardly projecting tabs 121C and 121D, respectively, which engage a pair of outwardly projecting tabs 221C and 221D, respectively, on the connector module housing 220. A strain relief device 230 configured to tightly grip the optical fiber ribbon cable 201 snaps onto the housing of the connector module 200 via keying arrangement in which connecting devices 191A and 191B formed in the housing of the transceiver module 100 are received in respective slots 231A and 231B formed in the strain relief device 230.

Figure 8:
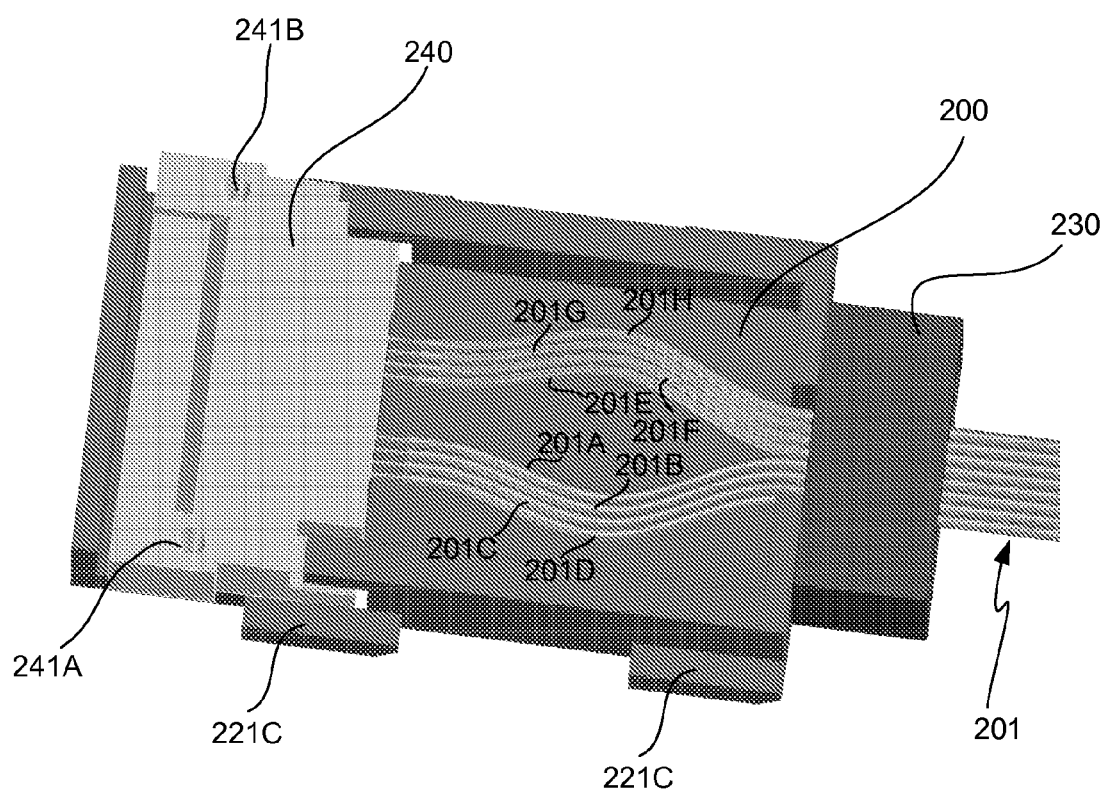
FIG. 8 illustrates a bottom perspective view of the connector module shown in FIG. 7.

FIG. 8 illustrates a bottom perspective view of the connector module 200. The connector module 200 will typically be made of a molded plastic material of the same type as the molded plastic material of which the transceiver module 100 is made. In the illustrative embodiment being described herein, the transceiver and connector modules are configured to use four transmit fibers 201A-201D and four receive fibers 201E-201H. Thus, the VCSEL IC 140 (FIG. 6) has four laser diodes that generate light and are amplitude modulated to transmit data over the respective transmit fibers 201A-201D. Similarly, the receive photodiode IC 160 (FIG. 6) has four photodiodes that are used to receive light transmitted over the four respective receive fibers 201E-201H. A strain relief mechanism 240 is configured to snap onto the housing of the connector module 200 Of course, the invention is not limited to this particular configuration for the transceiver and connector modules 100 and 200. The transceiver and connector modules 100 and 200 may be configured to use any number of transmit and/or receive fibers.

The connector module 200 includes an optics system 240 in which the ends of the fibers 201A-201H are secured, as will be described below in more detail with reference to FIG. 9. The optics system 240 has a housing that is preferably made of a molded plastic material of the same type as the molded plastic material of which the connector module 200 is made. The housing of the optics system 240 has two cone-shaped openings 241A and 241B formed therein that are shaped to receive and mate with the cone-shaped protrusions 177A and 177B, respectively, shown in FIG. 6, in order to allow the connector module 200 having the optics system 230 attached thereto to be passively aligned with the transceiver module 100. This alignment ensures that the optics system 120 of the transceiver module 100 is optically aligned with the optics system 230 of the connector module 200. This alignment of the optics systems 120 and 240, in turn, ensures that the ends of the fibers 201A-201D receive the light generated by the respective laser diodes of IC 140 and that the photodiodes of IC 160 receive light propagating out of the ends of the respective fibers 201E-201H.

Figure 9A:
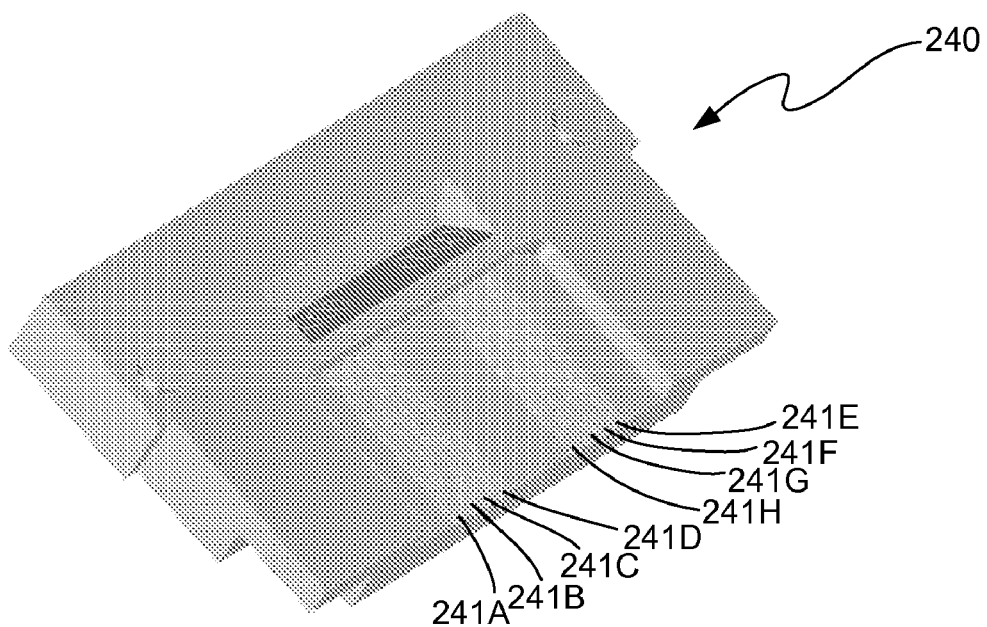
FIG. 9A illustrates a top perspective view of the optics system of the connector module shown in FIG. 8 before the ends of the fibers have been secured within the optics system of the connector module.

FIG. 9A illustrates a top perspective view of the optics system 240 of the connector module 200 before the ends of the fibers 201A-201H have been secured within the optics system 240. Prior to the fibers 201A-201H being secured within the optics system 240, the end portions of the fibers to be secured within the optics system 240 are stripped of the fiber jackets that surround the fiber claddings so that all that remains at the end portions of the fibers are the fiber cores surrounded by their respective claddings. The very ends of the fibers 201A-201H are cleaved and the end portions are placed in respective V-grooves 241A-241H formed in the optics system 240.

Figure 9B:
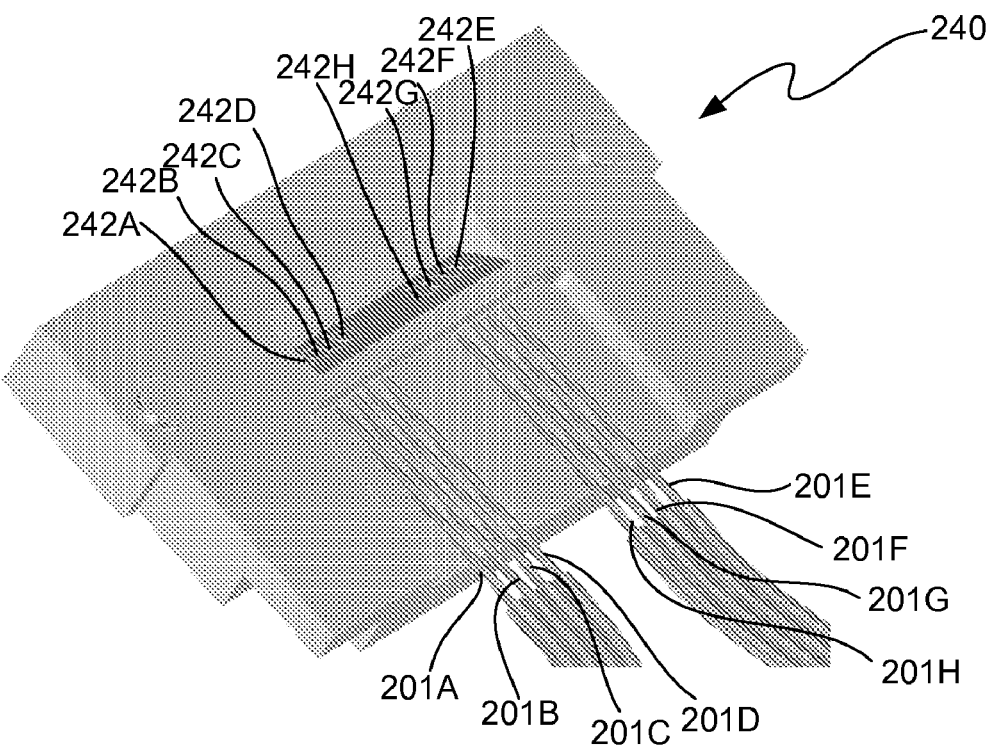
FIG. 9B illustrates a top perspective view of the optics system of the connector module shown in FIG. 8 after the ends of the fibers have been secured within the optics system of the connector module.

FIG. 9B illustrates a top perspective view of the optics system 240 of the connector module 200 after the ends of the fibers 201A-201H have been secured within the optics system 240. Lenses 242A-242D focus light from received from the laser diodes of the VCSEL IC 140 via the optics system 120 of the transceiver module 100 into the respective ends of the transmit fibers 201A-201D. Lenses 242E-242H focus light propagating out of the ends of the receive fibers 201E-201H onto the respective photodiodes of the receive photodiode IC 160 via the optics system 120 of the transceiver module 100.

Figure 9C:
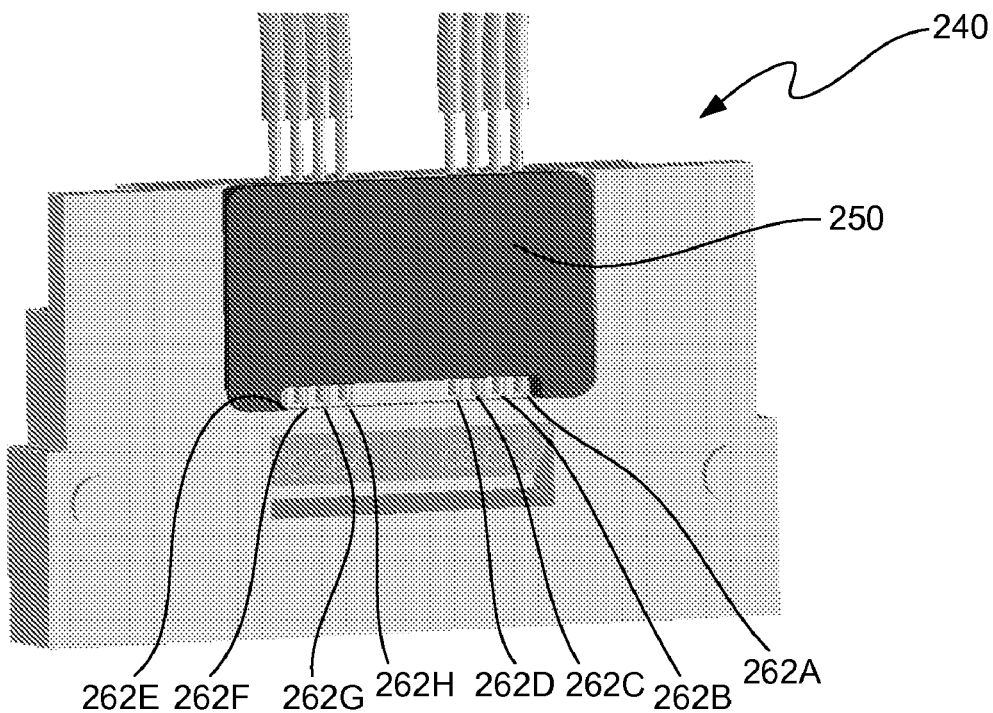
FIG. 9C illustrates a top perspective view of the optics system of the connector module shown in FIG. 8 having the ends of the fibers secured therein by a cover that has crushing features that partially crush the end portions of the fiber claddings when the cover is installed.

FIG. 9C illustrates a front perspective view of the optics system 240 of the connector module 200 having the ends of the fibers 201A-201H secured therein by a cover 250 that has crushing features (not shown) that partially crush the end portions of the fibers 201A-201H when the cover 250 is snapped onto the body of the optics system 240. These crushing features ensure that the end portions of the fibers 201A-201H are tightly gripped in the V-grooves 241A-241H and do not move after the cover 250 has been installed.

Figure 9D:
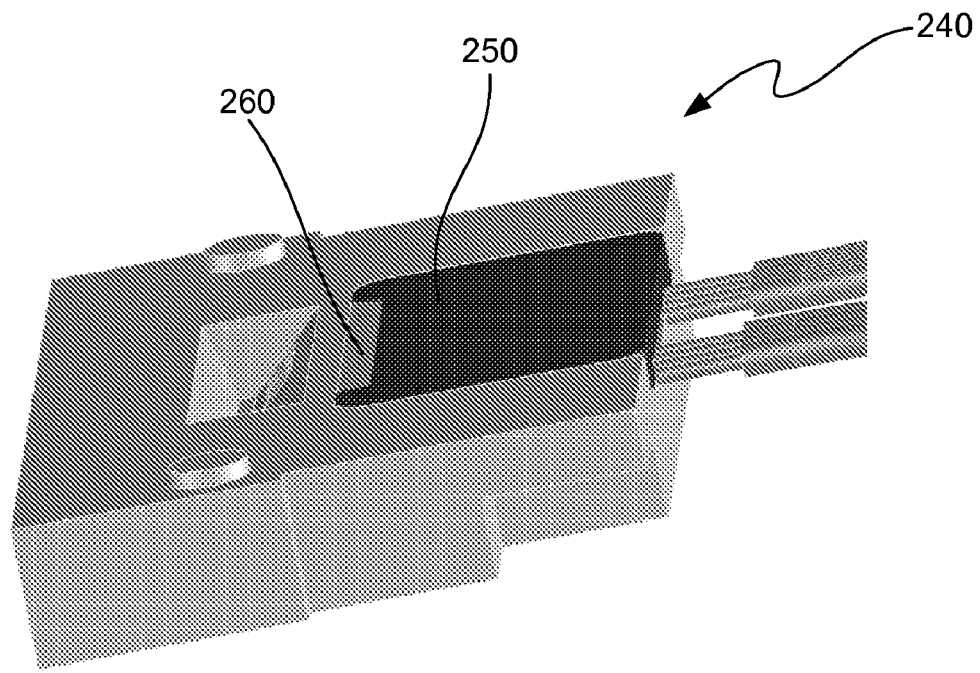
FIG. 9D illustrates a side perspective view of the optics system of the connector module shown in FIG. 8 having the ends of the fibers secured between the cover and the V-grooves and having an index-matching epoxy dispensed over the ends of the fibers.

FIG. 9D illustrates a side perspective view of the optics system 240 of the connector module 200 having the ends of the fibers 201A-201H secured between the cover 250 and the V-grooves 241A-241H and having an index-matching epoxy 260 dispensed over the ends of the fibers 201A-201H. The index-matching epoxy 260 bonds the end portions of the fibers 201A-201H to the cover and provides optical coupling between the ends of the fibers 201A-201H and respective openings 262A-262H formed in of the optics system 240 for coupling light from the lenses 242A-242D onto the ends of the fibers 201A-201D and for coupling light from the ends of fibers 201E-201H onto the lenses 242E-242H. By cleaving the ends of the fibers 201A-201H and using the index-matching epoxy to provide optical coupling, the potential for misalignment to occur as a result of temperature changes is eliminated, or at least greatly reduced, due to the fact that the fibers 201A-201H and the optics system 240 are made of materials that have the same, or at least substantially the same, coefficients of expansion.

Figure 10:
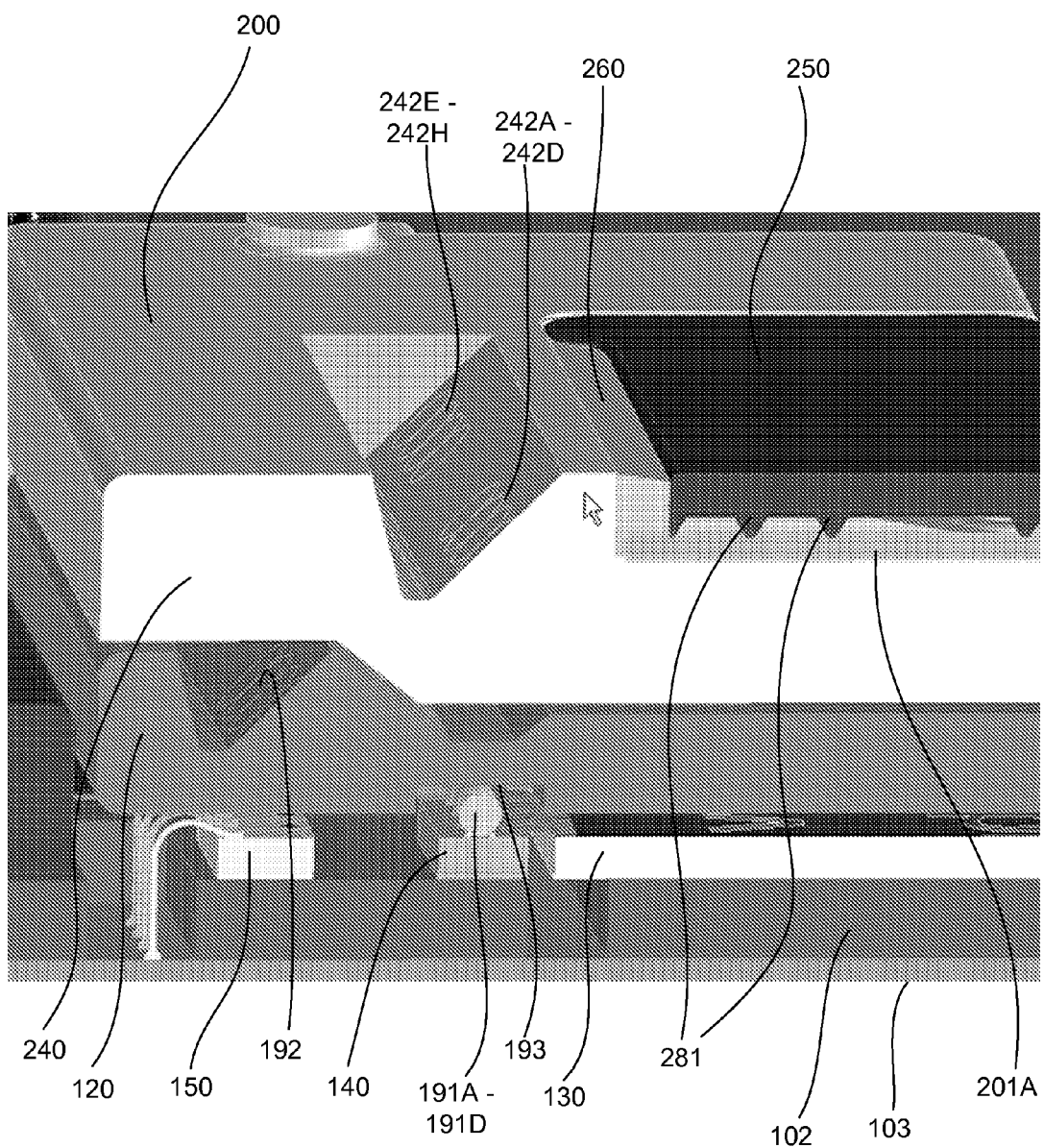
FIG. 10 illustrates a cross-sectional left side perspective view of the transceiver module in locking engagement with the connector module, which shows the optical coupling provided by the optics system of the transceiver module and the optics system of the connector module.

FIG. 10 illustrates a cross-sectional left side perspective view of the transceiver module 100 in locking engagement with the connector module 200, which shows the optical coupling provided by the optics system 120 of the transceiver module 100 and the optics system 240 of the connector module 200. In FIG. 10, many of the components described above with reference to FIG. 2 can be seen, such as the leadframe 102, the PCB 103, the VCSEL driver IC 130, the VCSEL IC 140, and the monitor photodiode IC 150 (the receive photodiode IC 160 cannot be seen). The crushing features 281 of the cover 250 that press into the cladding of one of the fibers 201A can also be seen in the view shown in FIG. 10.

The VCSEL IC 140 has four big-eye lenses 191A-191D disposed above the four respective VCSEL laser diodes (not shown). The lenses 191A-191D collimate light generated by the laser diodes onto respective lenses 242A-242D of the connector optics system 240. The transceiver module optics system 120 has a grating element 193 that redirects some of the light reflected through focusing reflective lens element 192 to the photodiodes of the monitor photodiode IC 150. The grating element 193 directs most of the light generated by the laser diodes that passes through the big-eye lenses 191A-191D onto the optics system 240 of the connector module 200. Lenses 242A-242D focus this light into the ends of the transmit fibers 201A-201D. Light propagating from the ends of the receive fibers 201E-201H is collimated by the collimating lenses 242E-242H onto an optical element (not shown) of the optics system 120 of the transceiver module, which then focuses the light onto the photodiodes of the receive photodiode IC 160 (FIG. 2).

Figure 11:
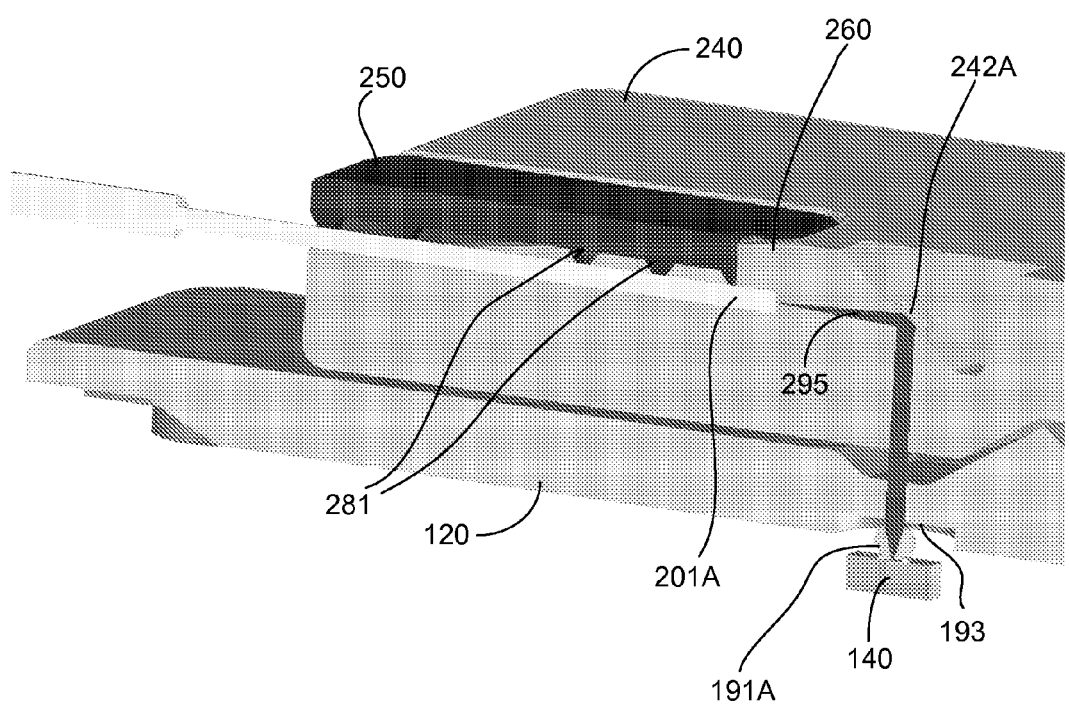
FIG. 11 illustrates a cross-sectional right side perspective view of the transceiver module in locking engagement with the connector module, which shows the optical coupling provided by the optics system of the transceiver module and the optics system of the connector module.

FIG. 11 illustrates a cross-sectional right side perspective view of the transceiver module 100 in locking engagement with the connector module 200, which shows the optical coupling provided by the optics system 120 of the transceiver module 100 and the optics system 240 of the connector module 200 on the transmit side of the transceiver module 100 for a single transmit fiber 201A. The light 295 generated by the laser diode of the laser diode IC 140 is collimated by the big-eye lens 191A onto the grating element 193, which directs most of the light onto the focusing lens 242A. As stated above, the grating element 193 directs some of the light onto the monitor photo diodes (not shown). Lens 242A focuses the light 295 onto the end of the optical fiber 201A.

As stated above with reference to FIG. 9D, the index-matching epoxy or gel 260 provides refractive index matching between the ends of the fibers 201A-201H and the lenses 242A-242H of the connector module 200. The lens 242A-242H focus the light to respective focus points that are much smaller than the diameters of the ends of the respective fibers 201A-201H. Therefore, some relative movement between the lenses 242A-242H and the ends of the fibers 201A-201H can occur due to, for example, thermal expansion without causing the focal points of the lenses 242A-242H not to be on the ends of the fibers 201A-201H. In addition, the collimated light beams produced by the big eye lenses 191A-191H are significantly smaller in diameter than the diameters of the focusing lenses 242A-242H, which means that the collimated beams can move small amounts and still be fully received by the respective lenses 242A-242H and therefore remain focused on the fiber ends. This feature of the invention allows elements to move due to, for example, the coefficients of thermal expansion (CTE) for the materials of which the various elements are made being mismatched without resulting in a degradation in signal integrity.

While many of the features of the invention described above result in performance improvements in and of themselves over transceivers that are currently available for use in optical communications, the combination of certain features results in even greater improvements over existing transceivers. For example, while the thermal isolation of the VCSEL IC 140 from the VCSEL driver IC 130 improves the performance of the VCSEL IC 140, the shortened leads forming the electrical paths between the VCSEL driver IC 130 and the VCSEL IC 140 further improve performance by improving signal integrity and reducing or eliminating EMI. In addition, the extremely tight optical coupling provided by the configurations and arrangement of the optics systems 120 and 240, as well as the use of the elements described above that maintain optical coupling during small movements that occur due to CTE mismatches result in further performance improvements.

It should be noted that the invention has been described with respect to illustrative embodiments for the purpose of describing the principles and concepts of the invention. The invention is not limited to these embodiments. For example, while the invention has been described with reference to using a VCSEL driver IC and a VCSEL laser diode IC, any laser diode driver circuit and any laser diode circuit may be used with the transceiver module. In addition, which a transceiver has been described above that performs both transmit and receive functions, the transceiver could be configured to function only as a transmitter or only as a receiver. As will be understood by those skilled in the art in view of the description being provided herein, modifications may be made to the embodiments described above to achieve the goals of the invention, and all such modifications are within the scope of the invention.

What is claimed is:

1. A transceiver module comprising:
   a leadframe having a plurality of die attach regions that form portions of a heat spreader device of the leadframe, the leadframe having at least a first slot formed therein to provide an air gap between at least first and second die attach regions of said plurality of die attach regions;
   a transceiver module housing secured to the leadframe, the transceiver module having a connector module alignment mechanism and a connector module locking mechanism, the connector module alignment mechanism being configured to engage an alignment mechanism of a connector module to align the connector module with the transceiver module, the connector module locking mechanism being configured to engage the connector module to secure the connector module to the transceiver module;
   an optics system of the transceiver module secured to the transceiver module housing, the optics system having a housing that houses one or more optical elements of the optics system;
   a circuit board comprising a plurality of conductors;
   a controller circuit secured to one of said plurality of die attach regions of the leadframe and having one or more electrical contacts that are electrically coupled to one or more of the conductors of the circuit board;
   a laser diode driver circuit secured to said first die attach region of the leadframe and having one or more electrical contacts that are electrically coupled to one or more of the conductors of the circuit board; and
   a laser diode circuit secured to said second die attach region of the leadframe and having one or more electrical contacts that are electrically coupled to one or more of the electrical contacts of the laser diode driver circuit, the laser diode circuit comprising said one or more laser diodes of the transceiver module, wherein said first slot formed in the leadframe at least partially thermally isolates the laser diode circuit from the laser diode driver circuit.

2. The transceiver module of claim 1, further comprising:
   a receive photodiode circuit secured to a third die attach region of said plurality of die attach regions and having one or more electrical contacts that are electrically coupled to one or more of the electrical contacts of the laser diode driver circuit, wherein said first slot formed in the leadframe also provides an air gap between at least first and third die attach regions that at least partially thermally isolates the receive photodiode circuit from the laser diode driver circuit.

3. The transceiver module of claim 1, further comprising:
   a monitor photodiode circuit secured to a fourth die attach region of the leadframe and having one or more electrical contacts that are electrically coupled to one or more of the conductors of the circuit board.

4. The transceiver module of claim 1, wherein the locking mechanism of the transceiver module is a sliding-lock mechanism comprising a first side sliding member and a second side sliding member that engage respective side tabs formed on the sides of the connector module and exert a force on the connector module that helps secure the connector module to the transceiver module.

5. The transceiver module of claim 1, wherein the connector module alignment mechanism of the transceiver module housing has at least first and second cone-shaped protrusions thereon that are configured to engage first and second cone-shaped opening in the connector module, wherein when the first and second cone-shaped protrusions are engaged with said first and second cone-shaped openings, the transceiver module is in alignment with the connector module.

6. The transceiver module of claim 1, further comprising:
   at least first and second cone-shaped openings formed in the optics system housing; and
   at least third and fourth cone-shaped protrusions on the transceiver module housing that are configured to engage the first and second cone-shaped openings, respectively, in the optics system housing, wherein when the third and fourth cone-shaped protrusions are engaged with said first and second cone-shaped openings in the optics system, the optics system is in alignment transceiver module is in alignment with said one or more laser diodes of the laser diode circuit.

7. The transceiver module of claim 6, further comprising: one or more big-eye lenses disposed on the laser diode circuit to receive light generated by one or more respective laser diodes of the laser diode circuit and to collimate the received light onto the optics system of the transceiver module.

8. The transceiver module of claim 1, wherein the housing of the transceiver module is formed of a molded plastic material.

9. The transceiver module of claim 1, wherein the leadframe has first and second side portions that are folded about first and second side portions of the transceiver module housing.

10. The transceiver module of claim 9, wherein the first and second side portions of the leadframe each have at least two or more finger portions that are separated from each other by a slot formed in the leadframe.

11. The transceiver module of claim 1, wherein said one or more electrical contacts of the laser diode circuit are electrically coupled to said one or more of the electrical contacts of the laser diode driver circuit by respective conductive leads that extend over the air gap provided by said first slot formed in the leadframe, each of the leads being about 0.3 millimeters (mm) to about 0.4 mm in length.

12. The transceiver module of claim 11, wherein the laser diode circuit is a vertical cavity surface-emitting laser diode (VCSEL) circuit and wherein the laser diode driver circuit is a VCSEL driver circuit.

13. The transceiver module of claim 2, wherein said one or more electrical contacts of the receive photodiode circuit are electrically coupled to said one or more of the electrical contacts of the laser diode driver circuit by respective conductive leads that extend over the air gap provided by said first slot formed in the leadframe, each of the leads being about 0.3 millimeters (mm) to about 0.4 mm in length.

14. The transceiver module of claim 2, wherein the receive photodiode circuit comprises at least four receive photodiodes for receiving four respective light beams transmitted over four respective receive optical fibers, each photodiode generating an electrical signal based on the respective light beam received thereby.

15. The transceiver module of claim 1, wherein the laser diode circuit comprises at least four laser diodes for generating four light beams to be transmitted over four respective transmit optical fibers.

16. The transceiver module of claim 15, wherein the monitor photodiode circuit comprises at least four monitor photodiodes for receiving four respective light beams generated by the four respective laser diodes, each monitor photodiode generating a respective electrical signal based on the respective light beam received thereby, each respective electrical signal being received by the controller circuit and processed by the controller circuit to generate one or more control signals, said one or more control signals being communicated over one or more conductors of the circuit board to the laser diode driver circuit, the laser diode driver circuit using the received control signals to generate one or more driver control signals, said one or more driver control signals being output to the laser diode circuit to control the output power level of at least one of the four laser diodes of the laser diode circuit.

17. A method for transmitting and receiving data over an optical communications network, the method comprising:
providing a leadframe having a plurality of die attach regions that form portions of a heat spreader device of the leadframe, the leadframe having at least a first slot formed therein to provide an air gap between at least first and second die attach regions of said plurality of die attach regions;
providing a transceiver module housing secured to the leadframe, the transceiver module having a connector module alignment mechanism and a connector module locking mechanism, the connector module alignment mechanism being configured to engage an alignment mechanism of a connector module to align the connector module with the transceiver module, the connector module locking mechanism being configured to engage the connector module to secure the connector module to the transceiver module;
providing an optics system of the transceiver module secured to the transceiver module housing, the optics system having a housing that houses one or more optical elements of the optics system;
providing a circuit board comprising a plurality of conductors;
providing a controller circuit secured to one of said plurality of die attach regions of the leadframe and having one or more electrical contacts that are electrically coupled to one or more of the conductors of the circuit board;
providing a laser diode driver circuit secured to said first die attach region of the leadframe and having one or more electrical contacts that are electrically coupled to one or more of the conductors of the circuit board; and
providing a laser diode circuit secured to said second die attach region of the leadframe and having one or more electrical contacts that are electrically coupled to one or more of the electrical contacts of the laser diode driver circuit, the laser diode circuit comprising said one or more laser diodes of the transceiver module, wherein said first slot formed in the leadframe at least partially thermally isolates the laser diode circuit from the laser diode driver circuit.

18. The method of claim 17, further comprising:
providing a receive photodiode circuit secured to a third die attach region of said plurality of die attach regions and having one or more electrical contacts that are electrically coupled to one or more of the electrical contacts of the laser diode driver circuit, wherein said first slot formed in the leadframe also provides an air gap between at least first and third die attach regions that at least partially thermally isolates the receive photodiode circuit from the laser diode driver circuit.

19. The method of claim 17, further comprising:
providing a monitor photodiode circuit secured to a fourth die attach region of the leadframe and having one or more electrical contacts that are electrically coupled to one or more of the conductors of the circuit board.

20. The method of claim 17, wherein said one or more electrical contacts of the laser diode circuit are electrically coupled to said one or more of the electrical contacts of the laser diode driver circuit by respective conductive leads that extend over the air gap provided by said first slot formed in the leadframe, each of the leads being about 0.3 millimeters (mm) to about 0.4 mm in length.

* * * * *